United States Patent

Chen et al.

[11] Patent Number: 5,547,759
[45] Date of Patent: Aug. 20, 1996

[54] COATED FUSER MEMBERS AND METHODS OF MAKING COATED FUSER MEMBERS

[75] Inventors: Jiann-Hsing Chen, Fairport; Lawrence P. Demejo, Rochester; Gary F. Roberts, Macedon; Richard J. Kosakowski; Muhammed Aslam, both of Rochester; John E. Derimiggio, Fairport, all of N.Y.

[73] Assignee: Eastman Kodak Company, Rochester, N.Y.

[21] Appl. No.: 164,280

[22] Filed: Dec. 9, 1993

[51] Int. Cl.$^6$ .............. B32B 15/06; F16C 13/00; G03G 15/20; H05B 3/00

[52] U.S. Cl. ............ 428/421; 428/422; 428/447; 428/448; 428/450; 428/451; 428/461; 428/463; 492/49; 492/53; 355/285; 355/290; 219/244; 219/469

[58] Field of Search .................. 428/421, 422, 428/447, 450, 451, 457, 461, 463, 448; 492/49, 53, 56, 57, 59; 355/282, 284, 285, 295, 290; 219/244, 469

[56] References Cited

U.S. PATENT DOCUMENTS

| | | | |
|---|---|---|---|
| Re. 33,770 | 12/1991 | Torino et al. | 355/290 |
| 3,435,500 | 4/1969 | Aser et al. | 29/130 |
| 3,912,901 | 10/1975 | Strella et al. | 219/216 |
| 4,087,394 | 5/1978 | Concannon | 260/29.6 F |
| 4,139,576 | 2/1979 | Yoshimura et al. | 260/857 PA |
| 4,196,256 | 4/1980 | Eddy et al. | 428/422 |
| 4,199,626 | 4/1980 | Stryjewski et al. | 427/444 |
| 4,272,179 | 6/1981 | Seanor | 355/3 FU |
| 4,567,349 | 1/1986 | Henry et al. | 219/216 |
| 4,789,565 | 12/1988 | Kon et al. | 427/375 |
| 4,796,046 | 1/1989 | Suzuki et al. | 355/3 FU |
| 4,804,576 | 2/1989 | Kuge et al. | 428/216 |
| 4,819,020 | 4/1989 | Matsushiro et al. | 355/14 FU |
| 4,842,944 | 6/1989 | Kuge et al. | 428/451 |
| 4,853,737 | 8/1989 | Hartley et al. | 355/289 |
| 4,883,715 | 11/1989 | Kuge et al. | 428/421 |
| 4,910,559 | 11/1989 | Kuge et al. | 428/421 |
| 4,914,146 | 4/1990 | Honda | 524/449 |
| 4,950,538 | 8/1990 | Honda et al. | 428/35.7 |
| 5,011,401 | 4/1991 | Sakurai et al. | 432/60 |
| 5,045,891 | 9/1991 | Senba et al. | 355/289 |
| 5,123,151 | 6/1992 | Uehara et al. | 29/130 |
| 5,133,998 | 7/1992 | Okazaki et al. | 427/428 |
| 5,153,660 | 10/1992 | Goto | 355/290 |
| 5,217,837 | 6/1993 | Henry et al. | 430/124 |
| 5,253,027 | 10/1993 | Goto | 355/290 |

FOREIGN PATENT DOCUMENTS

| | | |
|---|---|---|
| 322127 | 6/1989 | European Pat. Off. . |
| 321162 | 6/1989 | European Pat. Off. . |
| 483760-A | 10/1990 | European Pat. Off. . |
| 513822 | 11/1992 | European Pat. Off. . |
| 7089785 | 11/1980 | Japan . |
| 8024174 | 8/1981 | Japan . |
| 9000174-A | 5/1984 | Japan . |
| 3004284-A | 6/1986 | Japan . |
| 3004285-A | 6/1986 | Japan . |
| 3004286-A | 6/1986 | Japan . |
| 3004287-A | 6/1986 | Japan . |
| 61-1124974 | 6/1986 | Japan . |
| 3004283-A | 6/1986 | Japan . |
| 3027873-A | 7/1986 | Japan . |
| 1219875-A | 2/1988 | Japan . |
| 3038334-A | 7/1989 | Japan . |

OTHER PUBLICATIONS

K. Batzar, Principles of Fluoropolymer Coatings to Substrates.

*Primary Examiner*—Paul Thibodeau
*Assistant Examiner*—Vivian Chen
*Attorney, Agent, or Firm*—Anne B. Kiernan

[57] ABSTRACT

Coated fuser members such as a fuser roller, pressure roller, or fuser belt, and the method of making the coated fuser members are disclosed. The release coating comprises an outermost layer of fluoropolymer resin uniquely bonded to a fluoroelastomer layer by means of a fluoropolymer-containing polyamide-imide primer layer.

20 Claims, No Drawings

5,547,759

COATED FUSER MEMBERS AND METHODS OF MAKING COATED FUSER MEMBERS

FIELD OF THE INVENTION

This invention relates to electrostatographic apparatus and coated fuser members and methods of making coated fuser members. More particularly, this invention relates to an improved multi-layer coating for fuser members and the method of making the multi-layer coated fuser members.

BACKGROUND OF THE INVENTION

Known to the electrostatographic fixing art are various fuser members adapted to apply heat and pressure to a heat-softenable electrostatographic toner on a receiver, such as paper, to permanently fuse the toner to the receiver. Examples of fuser members include fuser rollers, pressure rollers, fuser plates and fuser belts for use in fuser systems such as fuser roller systems, fuser plate systems and fuser belt systems. The term "fuser member" is used herein to identify one of the elements of a fusing system. Commonly, the fuser member is a fuser roller or pressure roller and the discussion herein may refer to a fuser roller or pressure roller, however, the invention is not limited to any particular configuration of fuser member.

One of the long-standing problems with electrostatographic fixing systems is the adhesion of the heat-softened toner particles to the surface of a fuser member and not to the receiver, known as offset, which occurs when the toner-bearing receiver is passed through a fuser system. There have been several approaches to decrease the amount of toner offset onto fuser members. One approach has been to make the toner-contacting surface of a fuser member, for example, a fuser roller and/or pressure roller of a non-adhesive (non-stick) material.

One known non-adhesive coating for fuser members comprises fluoropolymer resins, but fluoropolymer resins are non-compliant. It is desirable to have compliant fuser members to increase the contact area between a fuser member and the toner-bearing receiver. However, fuser members with a single compliant rubber layer absorb release oils and degrade in a short time leading to wrinkling artifacts, non-uniform nip width and toner offset. To make fluoropolymer resin coated fuser members with a compliant layer, U.S. Pat. Nos. 3,435,500 and 4,789,565 disclose a fluoropolymer resin layer sintered to a silicone rubber layer which is adhered to a metal core. In U.S. Pat. No. 4,789,565, an aqueous solution of fluoropolymer resin powder is sintered to the silicone rubber layer. In U.S. Pat. No. 3,435,500, a fluoropolymer resin sleeve is sintered to the silicone rubber layer. Sintering of the fluoropolymer resin layer is usually accomplished by heating the coated fuser members to temperatures of approximately 500° C. Such high temperatures can have a detrimental effect on the silicone rubber layer causing the silicone rubber to smoke or depolymerize, which decreases the durability of the silicone rubbers and the adhesion strength between the silicone rubber layer and the fluoropolymer resin layer. Attempts to avoid the detrimental effect the high sintering temperatures have on the silicone rubber layer have been made by using dielectric heating of the fluoropolymer resin layer, for example see U.S. Pat. Nos. 5,011,401 and 5,153,660. Dielectric heating is, however, complicated and expensive and the fluoropolymer resin layer may still delaminate from the silicone rubber layer when the fuser members are used in high pressure fuser systems. In addition, a fuser member made with a fluoropolymer resin sleeve layer possesses poor abrasion resistance and poor heat resistance.

For the foregoing reasons, there is a need for fuser members and a method of fabricating fuser members which have a fluoropolymer resin layer, and compliant layer or layers, exhibiting improved adhesion between their constituent layers, improved abrasion resistance, improved heat resistance and the ability to be made more economically.

SUMMARY OF THE INVENTION

The fuser members of this invention comprise, in order, a support; a fluoroelastomer layer; a primer layer comprising a mixture of fluoropolymer resin and a polymer selected from the group consisting of polyamides, polyimides and polyamide-imides; and a fluoropolymer resin layer. Further, this invention includes the method of making the coated fuser members which comprises the steps of applying to a support a fluoroelastomer layer; coating the fluoroelastomer layer with a primer layer comprising a mixture of fluoropolymer resin and a polymer selected from the group consisting of polyamides and polyamic acids; applying to the primer layer a fluoropolymer resin layer; and sintering the fluoropolymer resin layer.

The fuser members of this invention have good non-adhesiveness to toner, abrasion resistance, heat resistance and adhesion between the layers. There is little or no deterioration of the layers or of the adhesion between the layers during the sintering step of the process, because the fluoroelastomer layer, primer layer and fluoropolymer resin layer have good heat resistance.

These and other features, aspects, and advantages of the present invention will become better understood with regard to the following description and claims.

DESCRIPTION OF THE INVENTION

The fuser member of this invention comprises, in order, a support; a fluoroelastomer layer; a primer layer comprising a mixture of fluoropolymer resin and a polymer selected from the group consisting of polyamides, polyimides and polyamide-imides; and a fluoropolymer resin layer. In preferred embodiments of the invention, the bonds between the fluoropolymer resin layers, primer layers and fluoroelastomer layers are very strong, making it very difficult to peel the layers apart.

The fuser member can be a pressure or fuser plate, pressure or fuser roller, a fuser belt or any other member on which a release coating is desirable. The support for the fuser member can be a metal element with or without additional layers adhered to the metal element. The metal element can take the shape of a cylindrical core, plate or belt. The metal element can be made of, for example, aluminum, stainless steel or nickel. The surface of the metal element can be rough, but it is not necessary for the surface of the metal element to be rough to achieve good adhesion between the metal element and the layer attached to the metal element. The additional support layers adhered to the metal element consist of layers of materials useful for fuser members, such as, silicone rubbers, fluoroelastomers and primers.

In one preferred embodiment of the invention, the support consists of a metal element coated with an adhesion promoter layer. The adhesion promoter layer can be any commercially available material known to promote the adhesion between fluoroelastomers and metal, such as silane coupling agents, which can be either epoxy-functionalized or amine-functionalized, epoxy resins, benzoguanamineformaldehyde resin crosslinker, epoxy cresol novolac, dianilinosulfone crosslinker, polyphenylene sulfide polyether sulfone, polyamide, polyimide and polyamide-imide. Preferred adhesion promoters are epoxy-functionalized silane coupling agents. The most preferable adhesion promoter is a dispersion of Thixon™ 300, Thixon™ 311 and triphenylamine in methyl ethyl ketone. The Thixon™ materials are supplied by Morton Chemical Co.

In another preferred embodiment of the invention, the support consists of a metal element with one or more base cushion layers. The base cushion layer or layers can consist of known materials for fuser member layers such as, one or more layers of silicone rubbers, fluorosilicone rubbers, or any of the same materials that can be used to form fluoroelastomer layers. Preferred silicone rubber layers consist of polymethyl siloxanes, such as EC-4952, sold by Emerson Cummings or Silastic™ J or E sold by Dow Corning. Preferred fluorosilicone rubbers include polymethyltrifluoropropylsiloxanes, such as Sylon™ Fluorosilicone FX11293 and FX11299 sold by 3M.

The base cushion layer may be adhered to the metal element via a base cushion primer layer. The base cushion primer layer can consist of a primer composition which improves adhesion between the metal element and the material used for the base cushion layer. If the base cushion layer is a fluoroelastomer material, the adhesion promoters described above can be used as the base cushion primer layer. Other primers for the application of fluorosilicone rubbers and silicone rubbers to the metal element are known in the art. Such primer materials include silane coupling agents, which can be either epoxy-functionalized or amine-functionalized, epoxy resins, benzoguanamineformaldehyde resin crosslinker, epoxy cresol novolac, dianilinosulfone crosslinker, polyphenylene sulfide polyether sulfone, polyamide, polyimide and polyamide-imide.

The inclusion of a base cushion layer on the metal element of the support increases the compliancy of the fuser member. By varying the compliancy, optimum fuser members and fuser systems can be produced. The variations in the compliancy provided by optional base cushion layers are in addition to the variations provided by just changing the thickness or materials used to make the fluoroelastomer layer and/or fluoropolymer resin layer. The presently preferred embodiment in a fuser roller system is to have a very compliant fuser roller and a non-compliant or less compliant pressure roller. In a fuser belt system it is preferred to have a compliant pressure roller and a non-compliant or less compliant belt. Although the above are the presently preferred embodiments, fuser systems and members including plates, belts and rollers can be made in various configurations and embodiments wherein at least one fuser member is made according to this invention.

The fluoroelastomer layer can comprise copolymers of vinylidene fluoride and hexafluoropropylene, copolymers of tetrafluoroethylene and propylene, terpolymers of vinylidene fluoride, hexafluoropropylene and tetrafluoroethylene, terpolymers of vinylidene fluoride, tetrafluoroethylene and perfluoromethylvinylethyl, and terpolymers of vinylidene fluoride, tetrafluoroethylene, and perfluoromethylvinylether. Specific examples of fluoroelastomers which are useful in this invention are commercially available from E. I. DuPont de Nemours and Company under the trade names Kalrez™, and Viton™ A, B, G, GF and GLT, and from 3M Corp. under the trade names Fluorel™ FC 2174, 2176 and FX 2530 and Aflas™. Additional vinylidene fluoride based polymers useful in the fluoroelastomer layer are disclosed in U.S. Pat. No. 3,035,950, the disclosure of which is incorporated herein by reference. Mixtures of the foregoing fluoroelastomers may also be suitable. Although it is not critical in the practice of this invention, the number-average molecular weight range of the fluoroelastomers may vary from a low of about 10,000 to a high of about 200,000. In the preferred embodiments, vinylidene fluoride-based fluoroelastomers have a number-average molecular weight range of about 50,000 to about 100,000.

A preferable material for the fluoroelastomer layer is a compounded mixture of a fluoroelastomer polymer, a curing material, and optional fillers. The curing material can consist of curing agents, crosslinking agents, curing accelerators and fillers or mixtures of the above. Suitable curing agents for use in the process of the invention include the nucleophilic addition curing agents as disclosed, for example, in the patent to Seanor, U.S. Pat. No. 4,272,179, incorporated herein by reference. Exemplary of a nucleophilic addition cure system is one comprising a bisphenol crosslinking agent and an organophosphonium salt as accelerator. Suitable bisphenols include 2,2-bis(4-hydroxyphenyl) hexafluoropropane, 4,4-isopropylidenediphenol and the like. Although other conventional cure or crosslinking systems may be used to cure the fluoroelastomers useful in the present invention, for example, free radical initiators, such as an organic peroxide, for example, dicumylperoxide and dichlorobenzoyl peroxide, or 2,5-dimethyl-2,5-di-t-butylperoxyhexane with triallyl cyanurate, the nucleophilic addition system is preferred. Suitable curing accelerators for the bisphenol curing method include organophosphonium salts, e.g., halides such as benzyl triphenylphosphonium chloride, as disclosed in U.S. Pat. No. 4,272,179 cited above.

The fluoroelastomer can include inert filler. Inert fillers are frequently added to polymeric compositions to provide added strength and abrasion resistance to a surface layer. In the fluoroelastomer layer of the fuser member of this invention, inclusion of the inert filler is optional. Omission of the inert filler does not reduce the adhesive strength of the fluoroelastomer layer. Suitable inert fillers which are optionally used include mineral oxides, such as alumina, silica, titania, and carbon of various grades.

Nucleophilic addition-cure systems used in conjunction with fluoroelastomers can generate hydrogen fluoride and thus acid acceptors may be added as fillers. Suitable acid acceptors include Lewis bases such as lead oxide, magnesium oxide, such as Megalite™ D and Y supplied by Merck & Co., calcium hydroxide, such as C-97, supplied by Fisher Scientific Co., zinc oxide, copper oxide, tin oxide, iron oxide and aluminum oxide which can be used alone or as mixtures with the aforementioned inert fillers in various proportions. The most preferable fluoroelastomer layer material comprises a compounded mixture of 100 parts Viton™ A, from 2 to 9 parts 2,2-bis(4-hydroxyphenyl) hexafluoropropane, commercially available as Cure™ 20, from 2 to 10 parts benzyl triphenylphosphonium chloride, commercially available as Cure 30™, from 5 to 30 parts lead oxide and from 0 to 30 parts Thermax™ (carbon black), mechanically compounded at room temperature on a two roll mill until it forms a uniform mixture. Cure™ 20 and Cure™ 30 are products of Morton Chemical Co.. Thermax™ is a product of R. T. Vanderbilt Co., Inc.. This compounded mixture can either be compression molded onto the support, or dispersed in solvent for dip-, ring- or spray-coating onto the support. If ring-coating is used to apply this compounded mixture to the support, then it is preferable to add a small amount of aminosiloxane polymer to the formulation described above, while compounding the fluoroelastomer material. For additional information on this fluoroelastomer composite material, see U.S. Pat. No. 4,853,737, which is incorporated herein by reference.

The fluoroelastomer layer can also consist of an interpenetrating network of fluoroelastomer and a silicone polymer. An interpenetrating network coating composition can be obtained by mechanically compounding fluoroelastomer polymer, functionalized siloxane, fluorocarbon curing materials and optional acid acceptors or other fillers to form a uniform mixture suitable for compression molding or solvent coating after dispersing the composite in a solvent. The fluoroelastomer polymers, curing materials, curing agents, curing accelerators, acid acceptors and other fillers can be selected from those previously described above. The functionalized siloxane is preferably a polyfunctional poly($C_{1-6}$ alkyl)phenyl siloxane or polyfunctional poly($C_{1-6}$ alkyl)siloxane. Preferred siloxanes are heat-curable, however peroxide-curable siloxanes can also be used with conventional initiators. Heat curable siloxanes include the hydroxy-functionalized organopolysiloxanes belonging to the classes of silicones known as "hard" and "soft" silicones. Preferred hard and soft silicones are silanol-terminated polyfunctional organopolysiloxanes.

Exemplary hard and soft silicones are commercially available or can be prepared by conventional methods. Examples of commercially available silicones include DC6-2230 silicone and DC-806A silicone (sold by Dow Corning Corp.), which are hard silicone polymers, and SFR-100 silicone (sold by General Electric Co.) and EC-4952 silicone (sold by Emerson Cummings Co.), which are soft silicone polymers. DC6-2230 silicone is characterized as a silanol-terminated polymethyl-phenylsiloxane copolymer containing phenyl to methyl groups in a ratio of about 1 to 1, difunctional to trifunctional siloxane units in a ratio of about 0.1 to 1 and having a number-average molecular weight between 2,000 and 4,000. DC-806A silicone is characterized as a silanol-terminated polymethylphenylsiloxane copolymer containing phenyl to methyl groups in a ratio of about 1 to 1 and having difunctional to trifunctional siloxane units in a ratio of about 0.5 to 1. SFR-100 silicone is characterized as a silanol- or trimethylsilyl-terminated polymethylsiloxane and is a liquid blend comprising about 60 to 80 weight percent of a difunctional polydimethylsiloxane having a number-average molecular weight of about 90,000 and 20 to 40 weight percent of a polymethylsilyl silicate resin having monofunctional (i.e. $SiO_2$) repeating units in an average ratio of between about 0.8 and 1 to 1, and having a number-average molecular weight of about 2,500. EC-4952 silicone is characterized as a silanol-terminated polymethylsiloxane having about 85 mole percent of difunctional dimethylsiloxane repeating units, about 15 mole percent of trifunctional methylsiloxane repeating units and having a number-average molecular weight of about 21,000.

Preferred fluoroelastomer-silicone interpenetrating networks have ratios of silicone to fluoroelastomer polymer between about 0.1 and 1 to 1 by weight, preferably between about 0.2 and 0.7 to 1. The interpenetrating network is preferably obtained by mechanically compounding, for example, on a two-roll mill a mixture comprising from about 40 to 70 weight percent of a fluoroelastomer polymer, from 10 to 30 weight percent of a curable polyfunctional poly($C_{1-6}$ alkyl)phenylsiloxane or poly($C_{1-6}$ alkyl)siloxane polymer, from 1 to 10 weight percent of a curing agent, from 1 to 3 weight percent of a curing accelerator, from 5 to 30 weight percent of an acid acceptor type filler, and from 0 to 30 weight percent of an inert filler.

When a fluoroelastomer-silicone interpenetrating network is the fluoroelastomer layer material, the support is coated by conventional techniques, usually by compression molding or solvent coating. The solvents used for solvent coating include polar solvents, for example, ketones, acetates and the like. Preferred solvents for the fluoroelastomer based interpenetrating networks are the ketones, especially methyl ethyl ketone and methyl isobutyl ketone. The dispersions of the interpenetrating networks in the coating solvent are at concentrations usually between about 10 to 50 weight percent solids, preferably between about 20 to 30 weight percent solids. The dispersions are coated on the support to give a 10 to 100 micrometer thick sheet when cured.

Curing of the interpenetrating network is carried out according to the well known conditions for curing fluoroelastomer polymers ranging, for example, from about 12 to 48 hours at temperatures of between 50° C. to 250° C. Preferably, the coated composition is dried until solvent free at room temperature, then gradually heated to about 230° C. over 24 hours, then maintained at that temperature for 24 hours.

Additional information on fluoroelastomer-silicone polymer interpenetrating networks can be found in U.S. patent application Ser. No. 122,754 filed Sep. 16, 1993, which is a continuation of U.S. application Ser. No. 940,929, filed Sep. 4, 1992. Also see, U.S. patent application Ser. No. 940,582, filed Sep. 4, 1992. These three patent applications are assigned to the Eastman Kodak Co. The disclosures of these patent applications are incorporated herein by reference.

The fluoropolymer resin layer consists of a fluoropolymer material, such as a semicrystalline fluoropolymer or a semicrystalline fluoropolymer composite. Such materials include polytetrafluoroethylene (PTFE), polyperfluoroalkoxy-tetrafluoroethylene (PFA), polyfluorinated ethylene-propylene (FEP), poly(ethylenetetrafluoroethylene), polyvinylfluoride, polyvinylidene fluoride, poly(ethylene-chloro-trifluoroethylene), polychlorotrifluoroethylene and mixtures of fluoropolymer resins. Some of these fluoropolymer resins are commercially available from DuPont as Teflon™ or Silverstone™ materials.

The preferred fluoropolymer resin layer is a blend of PTFE and PFA, commercially available from DuPont under the trade name Supra Silverstone™. Supra Silverstone™ is preferred because it is durable, abrasion resistant and forms a very smooth layer.

The primer layer between the fluoropolymer resin layer and the fluoroelastomer layer consists of a mixture of a fluoropolymer resin and polymer selected from polyamides, polyimides, polyamide-imides and mixtures of these.

The primer layer can be the product of sintering an aqueous dispersion of fluoropolymer resin and a polymer selected from the group consisting of polyamic acids and polyamides. Generally, upon heating, polyamic acids undergo a condensation reaction to form different polymers, for example, polyimides, polyamide-imides, polyether-imides, polybenzoxyazoles, polybenzimidazoles, and polybenzthiazoles. (It is possible that some of the polyamic acids in the primer will have already undergone the condensation reaction before heating.) The preferred polyamic acids for use in the primer composition of this invention are those that are precursors to polyimides and polyamide-imides, that is polyamic acids that will form polyimides or polyamide-imides upon heating.

One way to form polyamic acids is by the reaction of an aromatic dianhydride and an aromatic amine in an aqueous solution. This reaction is tailored to produce polyamic acids that are precursors to the desired polymer, such as, polyimides or polyamide-imides. This reaction and others are well known in the art. See, *Principles of Polymerization,* 2nd Ed., George Odian, pp. 153–154, John Wiley & Sons, Inc. and *Textbook of Polymer Science,* 3rd Ed., Fred W. Billmyer, Jr., pp. 427–28, John Wiley & Sons, Inc. Many polyamic acids are commercially available. Examples of commercially available polyamic acids which form polyimides when cured include: Ultan™, Larc™, Avimid™ K111, Exmid™ and Kapton™ available from Amoco. An example of a polyamic acid that forms a polyamide-imide when cured is Torlon™, also available from Amoco. An example of a polyamic acid that forms a polyether-imide when cured is Ultem™ available from General Electric. The polyamic acids which are mixed with the fluoropolymer resins to form the primer layer material are and will be generally referred to by the polymers they produce when heated, such as, polyimides, or polyamide-imide; however, it is understood that the primer mostly consists of the unreacted polyamic acids or polyamides until it is heated, at which time, it may consist of a polyimide, polyamide-imide or polyamide. The primer is heated either after it is applied or preferably after the application of the fluoropolymer resin layer during the sintering of the fluoropolymer resin layer.

The fluoropolymer resins in the primer layer composition can be any of the previously disclosed fluoropolymer resins, such as, polytetrafluoroethylene, polyperfluoroalkoxy-tetrafluoroethylene, polyfluorinated ethylene-propylene. It is not required that the fluoropolymer resin in the primer mixture be the same fluoropolymer resin or blend of fluoropolymer resins in the fluoropolymer resin layer. Preferred primers consist of 17 to 27 weight percent fluoropolymer resins preferably polytetrafluoroethylene, and 0.2 to 1.2 weight percent polyamides or polyamic acids, preferably polyamic acids, in an aqueous dispersion.

Preferable primer layers consist of a polyamide-imide-fluoropolymer resin mixture which can be prepared by the method taught in U.S. Pat. No. 4,087,394, which is incorporated herein by reference. The polyamide or polyimide and fluoropolymer resin mixture primer can be made similarly. The most preferable polyamide-imide-fluoropolymer resin mixture primer is Silverstone™ 855-021 supplied by DuPont.

The thicknesses of the layers of the fuser members of this invention can vary depending on the desired compliancy or noncompliancy of a fuser member. The preferred thicknesses of the layers for a fuser member having a base cushion layer as part of the support are as follows: the base cushion primer layer may be between 0.1 and 1 mils; the base cushion layer may be between 1 and 400 mils, the fluoroelastomer layer may be between 1 and 400 mils; the primer layer may be between 0.3 and 0.5 mils; and the fluoropolymer resin layer may be between 0.5 and 3 mils. The preferable thicknesses for the layers of a fuser member with no base cushion layer as part of the support are as follows: the adhesion promoter may be between 0.3 and 1 mils; the fluoroelastomer layer may be between 1 and 400 mils; the primer layer may be between 0.3 and 0.5 mils; and the fluoropolymer resin layer may be between 0.5 and 3 mils.

The compositions of the above-described layers of the fuser member may optionally contain additives or fillers such as aluminum oxide, iron oxide, magnesium oxide, silicon dioxide, titanium dioxide, calcium hydroxide, lead oxide, zinc oxide, copper oxide and tin oxide to increase the thermal conductivity or the hardness of the layers. Pigments may be added to affect the color. Optional adhesive materials and dispersants may also be added.

The coated fuser member of this invention having a support can be made by the following steps: applying to the support a fluoroelastomer layer; coating the fluoroelastomer layer with a primer layer comprising a mixture of fluoropolymer resin and a polymer selected from the group consisting of polyamides and polyamic acids; applying to the primer layer a fluoropolymer resin layer; and sintering the fluoropolymer resin layer.

In one embodiment of the invention, the support consists of a metal element and an adhesion promoter for a fluoroelastomer layer. In another embodiment of the invention the support consists of a primer layer and one or more base cushion layers with additional primer layers between the base cushion layers where necessary. The methods of making some of the embodiments of this invention will be described in more detail.

One embodiment of the invention, the fuser member without a base cushion layer can be prepared as follows:

Firstly, the support is prepared. A metal element is cleaned and dried. Any commercial cleaner or known solvent, for example isopropyl alcohol, which will remove grease, oil and dust can be used for this purpose. The support is further prepared by applying to the metal element the adhesion promoter layer. The adhesion promoter may be applied to the metal element by any method which provides a uniform coating. Examples of such methods include wiping, brushing, or spray-, ring- or dip-coating the material onto the metal support. The adhesion promoter is dried and cured typically in an oven at temperatures between about 320° F. and 350° F. Secondly, the fluoroelastomer layer is applied to the adhesion promoter layer usually by compression-molding, extrusion-molding, or blade-, spray-, ring- or dip-coating the fluoroelastomer layer onto the support. The fluoroelastomer layer is then cured typically in an oven at temperatures between about 390° F. and 500° F. Thirdly, the primer layer, comprising a mixture of fluoropolymer resin and polyamide, or polyamic acid, is applied in a uniform coat onto the fluoroelastomer layer. Examples of the methods of application are the same for the adhesion promoter layer. Fourthly, the fluoropolymer resin layer can be applied to the primer layer by the same methods for applying the fluoroelastomer layer. It is not necessary to dry the primer layer before applying the fluoropolymer resin layer. Preferably, the fluoropolymer resin layer is applied by spray-coating an aqueous emulsion of a fluoropolymer resin over the primer layer. Fifthly, the fuser member is placed in an oven typically at temperatures between about 600° F. and 800° F. to cure the fluoropolymer resin layer. (The specified temperature ranges can vary depending upon the material to be cured and the curing time.)

Other embodiments of the invention have a base cushion layer as part of the support. For example, to make a coated fuser member with a support consisting of a metal element, silicone rubber primer layer, and a condensation cure silicone rubber layer, and then the fluoroelastomer layer, primer layer and fluoropolymer resin layer, the method is as follows: Firstly, the metal element is cleaned and dried as described earlier. Secondly, the metal element is coated with a layer of a known silicone rubber primer, selected from those described earlier. A preferred primer for a condensation cure silicone rubber base cushion layer is GE 4044 supplied by General Electric. Thirdly, the silicone rubber layer is applied by an appropriate method, such as, blade-coating, ring-coating, injection-molding or compression-molding the silicone rubber layer onto the silicone rubber primer layer. A preferred condensation cure polydimethyl siloxane is EC-4952 produced by Emerson Cummings. Fourthly, the silicone rubber layer is cured, usually by heating it to temperatures typically between 410° F. and 450° F. in an oven. Fifthly, the silicone rubber layer undergoes corona discharge treatment usually at about 750 watts for 90 to 180 seconds. From here the process of applying and curing the fluoroelastomer layer, primer layer and fluoropolymer resin layer described above is followed.

In yet other embodiments of the invention with a base cushion layer as part of the support, the process is modified as follows. If the base cushion layer is an addition cure silicone rubber, the preferred silicone primer DC-1200 supplied by Dow Corning is applied to the metal element. Then, the addition cure silicone rubber is applied, for example, by injection-molding. The silicone rubber layer is then cured. If the base cushion layer is a fluorosilicone elastomer, the metal element is primed with a known silicone primer, then the fluorosilicone elastomer layer is applied, usually by compression-molding and cured. If a fluoroelastomer-silicone interpenetrating network or other additional fluoroelastomer material is used as the base cushion layer or layers, an adhesion promoter appropriate for a fluoroelastomer layer is applied to the metal element, the fluoroelastomer base cushion layer is applied to the base cushion primer layer and cured. If the base cushion layer is a fluoroelastomer material it is not necessary to cure, prime or to corona discharge treat the base cushion fluoroelastomer layer before application of the fluoroelastomer layer to it.

There are optional sandblasting, grinding and polishing steps. As stated earlier, it is not necessary to sandblast the metal element, because it is not required for good adhesion between the metal element and the adjacent layer. However, the fluoroelastomer layer and additional base cushion layer or layers, if any, may be ground during the process of making the fuser members. These layers may be mechanically ground to provide a smooth coating of uniform thickness which sometimes may not be the result when these layers are applied to the support, especially by the processes of compression-molding or blade-coating.

Any kind of known heating method can be used to cure or sinter the layers onto the fuser member, such as convection heating, forced air heating, infrared heating, and dielectric heating.

The fuser members produced in accordance with the present invention are useful in electrophotographic copying machines to fuse heat-softenable toner to a substrate. This can be accomplished by contacting a receiver, such as a sheet of paper, to which toner particles are electrostatically attracted in an imagewise fashion, with such a fuser member. Such contact is maintained at a temperature and pressure sufficient to fuse the toner to the receiver. Because these members are so durable they can be cleaned using a blade, pad, roller or brush during use. And, although it may not be necessary because of the excellent release properties of the fluoropolymer resin layer, release oils may be applied to the fuser member without any detriment to the fuser member.

The following examples illustrate the preparation of the fuser members of this invention.

EXAMPLE 1

A coated roller consisting of, in order, a support, a fluoroelastomer layer, a polyamide-imide-PTFE mixture primer layer and a blend of PTFE and PFA fluoropolymer resin layer was prepared.

A 0.220 inch aluminum cylindrical core with a 16.625 inch diameter and 3.17 inch length that was blasted with glass beads and cleaned and dried with dichloromethane was uniformly spray-coated with an adhesion promoter to a uniform thickness of from 0.5 to 1 mil. The adhesion promoter consisted of 1 gram of Thixon™ 300, 1 gram of Thixon™ 311 and 2 grams of a mixture of 0.5 grams triphenylamine in 40 grams of methyl ethyl ketone. The adhesion promoter was air dried for 15 minutes and placed in a convection oven at 325° F. for 45 minutes. The fluoroelastomer coating was prepared by compounding 100 parts of Viton™ A, 3 parts Cure™ 20, 6 parts Cure™ 30, 20 parts Thermax™ and 15 parts lead oxide in a two roll mill for about 30 to 45 minutes until a uniform composite was produced. Approximately 610 grams of the fluoroelastomer composite were compression molded onto the adhesion promoter layer on the core and cured at 325° F. for 2 hours under 75 tons/in$^2$ pressure. The mold was opened and closed a few times initially to squeeze entrapped air out of the fluoroelastomer material. The roller was removed from the mold, and placed in a convection oven for post-curing. The conditions for the post-cure were a 24 hour ramp to 232° C. and 24 hours at 232° C. The fluoroelastomer layer was ground to 40 mils in thickness. A uniform layer of primer about 0.3 mils thick was spray-coated onto the fluoroelastomer layer. The primer was Silverstone™ 855-021 from DuPont. The primer consisted of an aqueous dispersion of polyamic acid and PTFE. The primer was air dried. A layer of Supra Silverstone™ 855-500, a blend of PTFE and PFA fluoropolymer resins, was spray-coated onto the primer layer to about 1.0 mil thickness. The fuser member was then placed in a convection oven at 700° F. for approximately 10 minutes to sinter the Supra Silverstone™.

The roller had excellent adhesion between the layers. A peel strength test was performed. Typically to perform a peel strength test of a multi-layer fuser member, the top layer is cut and clamped into an Instron apparatus and the force required to peel the top layer from the adjacent layer on the roller is measured. For the roller made according to Example 1, the fluoropolymer resin layer was not discrete enough to perform a peel test between it, the primer layer and the fluoroelastomer layer.

EXAMPLE 2

Example 1 was repeated, except after applying the adhesion promoter, the roller was placed in a 350° F. oven for 1 hour; the fluoroelastomer layer was compression-molded onto the roller at 55 tons/in$^2$ for 110 minutes, and the fluoroelastomer layer had a final thickness of 50 mils.

The roller had excellent adhesion between the layers. As described in Example 1, no peel test between the fluoroelastomer layer, primer layer and fluoropolymer resin layer was possible.

EXAMPLE 3

Example 1 was repeated, but the fluoroelastomer layer had a final thickness of 100 mils.

The roller had excellent adhesion between the layers. As described in Example 1, no peel test between the fluoroelastomer layer, primer layer and fluoropolymer resin layer was possible.

EXAMPLE 4

A coated roller consisting of a stainless steel core, a base cushion primer layer and a silicone rubber base cushion layer as the support, and a fluoroelastomer layer, a polyamide-imide-PTFE mixture primer layer and an FEP fluoropolymer resin top layer was prepared.

A stainless steel core was cleaned with dichloromethane and dried. The core was primed with a uniform coat of DC-1200 applied by wiping it onto the core. Then, Silastic J™ was injection-molded onto the core and cured at 232° C. for 2 hours and under 75 tons/in$^2$ pressure. The roller was removed from the mold and post-cured in a convection oven. The conditions for the post-cure were 24 hours ramp to 232° C. and 24 hours at 232° C. The Silastic J™ layer was 380 mils thick. After air cooling the roller, the Silastic J™ layer was corona discharge treated for 15 minutes at 750 watts. The same fluoroelastomer material prepared in Example 1 was diluted to a 25% solid solution in a 1:1 methyl ethyl ketone and methyl isobutyl ketone solvent and ring-coated onto the Silastic J™. The roller was air dried for 16 hours and post-cured for 4 hours ramp to 205° C. and 12 hours at 205° C. The fluoroelastomer layer had a thickness of 1 mil. The fluoroelastomer layer was spray-coated with Silverstone™ 855-021 primer, and air dried. Then an aqueous solution of FEP Silverstone™ 56-200, available from DuPont was spray-coated onto the roller and the roller was cured at 600° F. for 15 minutes.

The roller had excellent adhesion between the layers. As described in Example 1, no peel test between the fluoroelastomer layer, primer layer and fluoropolymer resin layer was possible.

EXAMPLE 5

A coated roller consisting of two silicone rubber base cushion layers, a fluoroelastomer layer, a polyamide-imide-PTFE mixture primer layer and a Supra Silverstone™ fluoropolymer resin layer was prepared. This Example was prepared the same way as Example 4 except that between the Silastic J™ layer and the fluoroelastomer layer, a red rubber layer consisting of EC-4952 was added. The red rubber layer was blade-coated directly onto the Silastic J™ layer without first priming or corona treating the Silastic J™ layer, then cured for 24 hours at room temperature, and post-cured for 12 hours at 410° F. and 48 hours at 450° F. in a convection oven. The fluoroelastomer layer, primer layer and Supra Silverstone™ fluoropolymer resin layer were coated onto the red rubber layer and cured the same way they were applied to the Silastic J™ layer and cured in Example 4. The resulting thicknesses of the layers were 380 mils Silastic J™ layer, 20 mils red rubber layer, 1 mil fluoroelastomer layer, 0.3 mils primer layer and a 1 mil Supra Silverstone™ layer.

The roller had excellent adhesion between the layers. As described in Example 1, no peel test between the fluoroelastomer layer, primer layer and fluoropolymer resin layer was possible.

EXAMPLE 6

Example 1 was repeated except a stainless steel core was used, and the resulting thickness of the layers differed. The fluoroelastomer layer was about 10 mils; the primer layer, Silverstone™ 855-021, and the resin layer, Supra Silverstone™ 855-500, were about 1.0 mil. The roller had excellent adhesion between the layers. As described in Example 1, no peel test between the fluoroelastomer layer, primer layer and fluoropolymer resin layer was possible.

EXAMPLE 7

Example 4 was repeated except an aluminum core was used, instead of DC 1200, GE 4044 primer was used, instead of a Silastic J™ base cushion layer as part of the support a red rubber silicone, EC4952 layer was used, and the fluoropolymer resin layer was Supra Silverstone™ 855-500. The resulting thicknesses of the layers were: 0.5 mil layer of GE 4044, 100 mils layer of red rubber, 1.0 mil layer of fluoroelastomer, and 1.0 mil layer of the Supra Silverstone™ 855-500 layer and primer layer combined. The roller had excellent adhesion between the layers. As described in Example 1, no peel test between the fluoroelastomer layer, primer layer and fluoropolymer resin layer was possible.

COMPARATIVE EXAMPLE 1

A coated slab consisting of a silicone rubber layer, a polyamide-imide-PTFE mixture primer layer and a blend of PTFE and PFA fluoropolymer resin layer was prepared.

A stainless steel plate was cleaned and dried and coated with a silicone primer, GE 4044. Silicone EC-4952 was blade-coated onto the slab, cured for 24 hours at room temperature, and post-cured for 12 hours ramp to 410° F. and 48 hours at 410° F. in a convection oven. The rubber was allowed to cool to room temperature. The Silverstone™ 855-021 primer was spray-coated to approximately 0.3 mils thick onto the cured silicone rubber layer, and air dried. The Supra Silverstone™ 855-500 layer was spray-coated onto the primer layer to approximately 1 mil thick. The slab was cured at 600° F. for 15 minutes, during which time the fluoropolymer resin layer (Supra Silverstone™ layer) delaminated from the primer layer.

COMPARATIVE EXAMPLE 2

A coated roller was prepared consisting of a silicone rubber layer, a fluoroelastomer layer, a two-coat conventional primer layer, and a blend of PTFE and PFA fluoropolymer resin layer.

A primer GE 4044 was uniformly coated onto an aluminum roller. EC-4952 was blade-coated onto the roller and cured as described in Example 5 producing a 72 mils thick layer of EC-4952. The rubber was corona discharge treated for 15 minutes at 750 watts and the same fluoroelastomer layer of Example 4 was spray-coated onto the rubber layer and cured as described in Example 4. A conventional two-step silicone primer consisting of an acid primer, Silverstone™ 855-300, and an aqueous dispersion of PTFE, Silverstone™ 855-401, were separately spray-coated onto the roller and air dried. Then, Supra Silverstone™ 855-500 was spray-coated onto the roller and cured at 780° C. for 15 minutes.

The fluoropolymer resin layer (Supra Silverstone™ layer) delaminated from the primer layer during the cure process.

COMPARATIVE EXAMPLE 3

A silicone rubber coated fuser roller was prepared. A 2.43 inch diameter aluminum core was primed with a layer of DC 1200, air dried for 30 minutes and placed in a convection oven for 2 hours at 100° C. It was cooled to the touch and a hand-mixture of 300 grams of Silastic J™ and 30 grams Silastic J™ curing agent, after degassing for 5–10 minutes, was liquid injection-molded onto the core about 60 to 70 mils thick. The coating was dried for 16 hours on the mold and post-cured for 4 hours ramp to 205° C. and 12 hours at 205° C. in a convection oven. The Silastic J™ was ground to a final thickness of 40 mils.

COMPARATIVE EXAMPLE 4

A 40 mil thick Silastic E™ roller was prepared by the same process indicated in Example 3 except 300 grams of Silastic E™ and 30 grams of Silastic E™ curing agent were substituted for the same Silastic J™ products.

Some of these rollers were tested for their durability in a simulated fuser roller system. The upper roller was an aluminum core that was ground to a depth of 9 mils in two places 6 inches apart around the circumference of the roller. It was also ground to form two edges 180° apart lengthwise across the roller between the two 6 inch grooves to simulate a 9 mil thick receiver contacting the lower roller. Upper and lower rollers were internally heated by lamps: the upper roller to 250° F., and the lower roller to 150° F. The applied load was 96 pli. The corresponding nip pressures were calculated by dividing the applied load by the nip widths. The speed of the rollers was 6 inches per second. Two rollers made as described in Example 2 and Comparative Examples 3 and 4 were tested, one roller for 48 hours and another for 100 hours. Shore A at room temperature was measured at the beginning and at the end of the 48 hour and 100 hour tests for each roller. The step and groove were measured at the drive (D) and non-drive (ND) ends of each roller at 48 hours and 100 hours for the various tested rollers. The groove is the measurement of the depth of the cut into the lower roller where it contacted the 9 mil ridges around the circumference of the upper roller. The step is the depth to which the roller material was compressed because of contact with the simulated 9 mil ridges lengthwise across the upper roller. The results of this test are compiled in the following two tables.

The invention has been described in detail with particular reference to preferred embodiments thereof, but it will be understood that variations and modifications can be effected within the spirit and scope of the invention.

What is claimed is:

1. A fuser member comprising, in order:

a support comprising a metal element;

a fluoroelastomer layer comprising fluoroelastomer polymer, said fluoroelastomer polymer is selected from the group consisting of copolymers of vinylidene fluoride, and hexafluoropropylene; and terpolymers of vinylidene fluoride, hexafluoropropylene and tetrafluoroethylene;

a primer layer comprising a mixture of a fluoropolymer resin and polyamide-imide, said primer layer adjacent to said fluoroelastomer layer; and a fluoropolymer resin layer comprising fluoropolymer resin selected from the group consisting of polytetrafluoroethylene, polyperfluoroalkoxy-tetrafluoroethylene, polyfluorinated ethylene-propylene, and blends thereof, said fluoropolymer resin layer adjacent to said primer layer.

2. The fuser member of claim 1, wherein said fluoroelastomer polymer is a copolymer of vinylidene fluoride and hexafluoropropylene.

TABLE 1

48 HOUR STEP AND GROOVE ROLLER TEST

| # ROLLER OVERCOATS | APPLIED LOAD (PLI) | NIP PRESS (PSI) | NIP WIDTH (MILS) INIT. | NIP WIDTH (MILS) FIN. | ROLLER SHORE A INIT. | ROLLER SHORE A FIN. | STEP (MILS) | GROOVE (MILS) |
|---|---|---|---|---|---|---|---|---|
| 2 | 96 | 400 | 235 | 245 | 85 | 84 | 0.2(D) 0.2(ND) | 0.2(D) 1.2(ND) |
| CE3 | 96 | 457 | 210 | 210* | 85 | 86* | 0.3(D)* 0.3(ND)* | 1.3(D)* 1.3(ND)* |
| CE4 | 96 | 409 | 240 | 250 | 76 | 77 | 0.2(D) 0.2(ND) | 1.0(D) 2.3(ND) |

*MEASURED AT 47 HOURS.

TABLE 2

100 HOUR STEP AND GROOVE ROLLER TEST

| EXAMPLE NO. | APPLIED LOAD (PLI) | NIP PRESS (PSI) | NIP WIDTH (MILS) INIT. | NIP WIDTH (MILS) FIN. | ROLLER SHORE A INIT. | ROLLER SHORE A FIN. | STEP (MILS) | GROOVE (MILS) |
|---|---|---|---|---|---|---|---|---|
| 2 | 96 | 400 | 245 | 235 | 84 | 85 | 0.3(D) 0.3(ND) | 0.3(D) 1.2(ND) |
| CE3 | 96 | 457 | 210 | 215 | 86 | 85 | 0.5(D) 0.4(ND) | 1.5(D) 1.4(ND) |
| CE4 | 96 | 369 | 250 | 270 | 77 | 76 | 0.2(D) 0.2(ND) | 1.2(D) 2.2(ND) |

The results of these tests indicate that the coated fuser members of this invention have excellent fatigue resistance, and durability. In addition, the fuser members of this invention also possess very high abrasion resistance and do not permanently stain when contacted with toner unlike the Silastic™ J and E materials of the Comparative Examples. Further, toner fused to paper by the rollers of this invention had a very smooth texture, and release oils do not cause degradation of the fuser member.

3. The fuser member of claim 1 wherein said fluoroelastomer polymer is a terpolymer of vinylidene fluoride, hexafluoropropylene, and tetrafluoroethylene.

4. The fuser member of claim 1, wherein said support further comprises a layer of adhesion promoter adjacent to said metal element.

5. The fuser member of claim 4, wherein said adhesion promoter comprises an epoxy-functionalized silane coupling agent.

6. The fuser member of claim 5, wherein said base cushion layer comprises polymethyl siloxane rubber.

7. The fuser member of claim 1, wherein said support further comprises a base cushion primer layer adjacent to said metal element, and a base cushion layer on said base cushion primer layer, said base cushion layer comprising a material selected from the group consisting of silicone rubbers, fluorosilicone rubbers, fluoroelastomer polymers, and interpenetrating networks of siloxanes and fluoroelastomer polymers.

8. The fuser member of claim 1, wherein said fluoroelastomer layer comprises a compounded mixture of said fluoroelastomer polymer and curing material.

9. The fuser member of claim 8, wherein said curing material comprises a curing agent and a curing accelerator.

10. The fuser member of claim 1, wherein said fluoropolymer resin layer is polytetrafluoroethylene.

11. The fuser member of claim 1, wherein said fluoropolymer resin layer is polyperfluoroalkoxytetrafluoroethylene.

12. The fuser member of claim 1, wherein said fluoropolymer resin layer is polyfluorinated ethylene-propylene.

13. The fuser member of claim 1, wherein said fluoropolymer resin layer is a blend of polytetrafluoroethylene and polyperfluoroalkoxytetrafluoroethylene.

14. The fuser member of claim 1, wherein said primer layer is formed from an aqueous solution comprising 17 to 27 weight percent of said fluoropolymer resin and 0.2 to 1.2 weight percent of said polyamide-imide.

15. A fuser member comprising, in order:
a metal cylindrical support;
a fluoroelastomer layer comprising a compounded mixture of a fluoroelastomer polymer, 2,2'-bis(4-hydroxyphenyl) hexafluoropropane, benzyl triphenylphosphonium chloride, and acid acceptor filler; wherein said fluoroelastomer polymer is a copolymer of vinylidene fluoride and hexafluoropropylene, or a terpolymer of vinylidene fluoride, hexafluoropropylene, and tetrafluoroethylene;
a primer layer comprising a mixture of a polyamide-imide and a fluoropolymer resin, said primer layer being coated onto said fluoroelastomer layer; and
a fluoropolymer resin layer comprising a fluoropolymer resin selected from the group consisting of polytetrafluoroethylene, polyperfluoroalkoxy-tetrafluoroethylene, polyfluorinated ethylene-propylene, and blends thereof; said fluoropolymer resin layer being coated on said primer layer.

16. The fuser member of claim 15, wherein said fluoropolymer resin layer coated on said primer layer is a blend of polytetrafluoroethylene and polyperfluoroalkoxy-tetrafluoroethylene.

17. The fuser member of claim 15, further comprising between said metal cylindrical support and said fluoroelastomer layer, a silicone rubber primer layer adjacent to said metal cylindrical support and a polymethyl siloxane rubber layer coated onto said silicone rubber primer layer.

18. The fuser member of claim 15, wherein said primer layer comprises an aqueous solution comprising 17 to 27 weight percent of said fluoropolymer resin and 0.2 to 1.2 weight percent of said polyamide-imide.

19. The fuser member of claim 15, further comprising an adhesion promoter between said metal cylindrical support and said fluoroelastomer layer.

20. The fuser member of claim 15, wherein said acid acceptor filler comprises magnesium oxide, calcium hydroxide, or mixtures thereof.

* * * * *